US012646753B2

(12) United States Patent
Zhang et al.

(10) Patent No.: US 12,646,753 B2
(45) Date of Patent: Jun. 2, 2026

(54) NON-FLAMMABLE ELECTROLYTES

(71) Applicant: UCHICAGO ARGONNE, LLC, Chicago, IL (US)

(72) Inventors: Zhengcheng Zhang, Naperville, IL (US); Qian Liu, Darien, IL (US); Krzysztof Pupek, Plainfield, IL (US); Trevor L. Dzwiniel, Carol Stream, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 980 days.

(21) Appl. No.: 17/411,706

(22) Filed: Aug. 25, 2021

(65) Prior Publication Data

US 2023/0100910 A1 Mar. 30, 2023

(51) Int. Cl.
*H01M 10/0568* (2010.01)
*H01M 10/0525* (2010.01)
(Continued)

(52) U.S. Cl.
CPC ... *H01M 10/0568* (2013.01); *H01M 10/0525* (2013.01); *H01M 10/0567* (2013.01); *H01M 10/0569* (2013.01); *H01M 2300/0037* (2013.01)

(58) Field of Classification Search
CPC ......... H01M 10/0525; H01M 10/0567; H01M 10/0568; H01M 10/0569; H01M 2300/0037
See application file for complete search history.

(56) References Cited

U.S. PATENT DOCUMENTS 9,287,597 B2 3/2016 Friesen et al.
9,515,350 B2 12/2016 Sakuma et al.
(Continued)

OTHER PUBLICATIONS

Xue, et al., "FSI-inspired solvent and "full fluorosulfonyl" electrolyte for 4 V class lithium-metal batteries," Energy & Environmental Science 13(1), pp. 212-220 (2020).

*Primary Examiner* — Osei K Amponsah
(74) *Attorney, Agent, or Firm* — Foley & Lardner LLP

(57) ABSTRACT

An electrolyte for use in a lithium-ion or sodium-ion battery includes a salt such as a lithium salt, a sodium salt, or a mixture of any two or more thereof; and a solvent that includes a compound represented as Formula I, II, or a mixture of any two or more thereof:

(I)

(I)

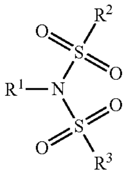

(II)

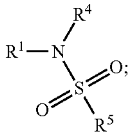

wherein: $R^1$ is substituted or unsubstituted alkyl, substituted or unsubstituted haloalkyl, substituted or unsubstituted alkoxy, substituted or unsubstituted cycloalkyl, substituted (Continued)

or unsubstituted aryl, or substituted or unsubstituted polyether; $R^2$ is F, a fluoroalkyl, fluorocycloalkyl; $R^3$ is F, a fluoroalkyl, fluorocycloalkyl; and $R^4$ is substituted or unsubstituted alkyl, substituted or unsubstituted haloalkyl, substituted or unsubstituted alkoxy, substituted or unsubstituted cycloalkyl, substituted or unsubstituted aryl, substituted or unsubstituted aralkyl, or substituted or unsubstituted polyether; and $R^5$ is a fluoroalkyl or fluorocycloalkyl.

20 Claims, 3 Drawing Sheets

(51) Int. Cl.
*H01M 10/0567* (2010.01)
*H01M 10/0569* (2010.01)

(56) References Cited

U.S. PATENT DOCUMENTS

2012/0022269 A1* 1/2012 Honda .................. C07C 311/48
548/335.5
2019/0288337 A1* 9/2019 Choi ................. H01M 10/0525
2020/0308107 A1 10/2020 Shao-Horn et al.

* cited by examiner

NON-FLAMMABLE ELECTROLYTES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is related to non-flammable electrolytes that are used in electrochemical energy storage. In particular, the present technology describes electrolytes based upon sulfonylimide compounds.

SUMMARY

In one aspect an electrolyte for use in a lithium-ion or sodium-ion battery is provided, the electrolyte including a salt comprising a lithium salt, a sodium salt, or a mixture of any two or more thereof: a solvent comprising a compound represented as Formula I, II, or a mixture of any two or more thereof:

(I)

(I)

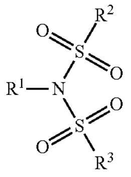

(II)

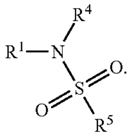

In the above formulae, $R^1$ is substituted or unsubstituted alkyl, substituted or unsubstituted haloalkyl, substituted or unsubstituted alkoxy, substituted or unsubstituted cycloalkyl, substituted or unsubstituted aryl, or substituted or unsubstituted polyether; $R^2$ is F, a fluoroalkyl, fluorocycloalkyl; $R^3$ is F, a fluoroalkyl, fluorocycloalkyl; and $R^4$ is substituted or unsubstituted alkyl, substituted or unsubstituted haloalkyl, substituted or unsubstituted alkoxy, substituted or unsubstituted cycloalkyl, substituted or unsubstituted aryl, substituted or unsubstituted aralkyl, or substituted or unsubstituted polyether; and $R^5$ is a fluoroalkyl or fluorocycloalkyl.

In another aspect, an electrochemical device is provided that includes a cathode, an anode, and an electrolyte that includes a salt comprising a lithium salt, a sodium salt, or a mixture of any two or more thereof: a solvent comprising a compound represented as Formula I, II, or a mixture of any two or more thereof:

(I)

(I)

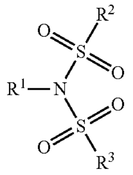

(II)

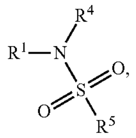

wherein, $R^1$ is substituted or unsubstituted alkyl, substituted or unsubstituted haloalkyl, substituted or unsubstituted alkoxy, substituted or unsubstituted cycloalkyl, substituted or unsubstituted aryl, or substituted or unsubstituted polyether; $R^2$ is F, a fluoroalkyl, fluorocycloalkyl; $R^3$ is F, a fluoroalkyl, fluorocycloalkyl; and $R^4$ is substituted or unsubstituted alkyl, substituted or unsubstituted haloalkyl, substituted or unsubstituted alkoxy, substituted or unsubstituted cycloalkyl, substituted or unsubstituted aryl, substituted or unsubstituted aralkyl, or substituted or unsubstituted polyether; and $R^5$ is a fluoroalkyl or fluorocycloalkyl.

DETAILED DESCRIPTION

Figure 1:
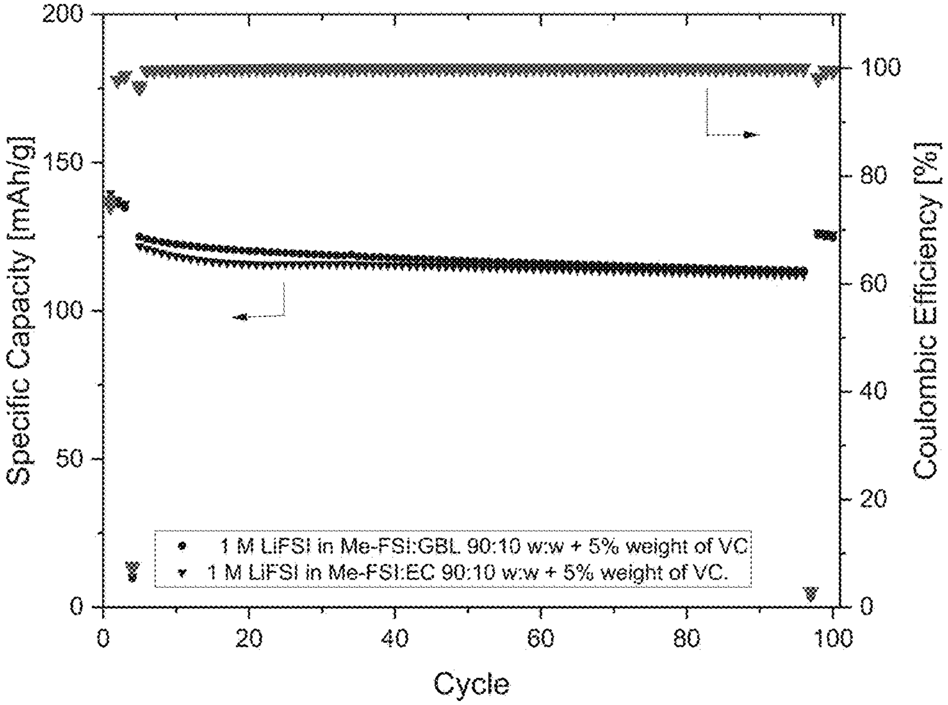
FIG. 1 is a dual axis graph illustrating the cell performance of MeFSI-based electrolytes in a NMC622/graphite cell in terms of specific capacity and Coulombic efficiency, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, the term "substituted," unless specifically defined differently, refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like. For some groups, substituted may provide for attachment of an alkyl group to another defined group, such as a cycloalkyl group.

Alkyl groups include straight chain and branched chain, saturated hydrocarbon groups having from 1 to 14 carbons unless indicated otherwise. For example, a $C_{1-6}$ alkyl group includes alkyl groups with 1, 2, 3, 4, 5, or 6 carbon atoms. In some embodiments, an alkyl group has from 1 to 12 carbon atoms, from 1 to 10 carbons, from 1 to 8, 1 to 6, or 1, 2, 3 or 4 carbon atoms. Examples of straight chain alkyl groups include groups such as methyl, ethyl, n-propyl, n-butyl, n-pentyl, n-hexyl, n-heptyl, and n-octyl, n-decyl, n-dodecyl and n-tetradecyl groups. Examples of branched chain alkyl groups include, but are not limited to, isopropyl, iso-butyl, sec-butyl, tert-butyl, neopentyl, isopentyl, and 2,2-dimethylpropyl groups. Alkyl groups may be unsubstituted or are optionally substituted with one or more hydroxyl or halogen groups. In some embodiments, an alkyl group is a $C_1$-$C_6$ alkyl or $C_1$-$C_4$ alkyl group. In some embodiments, an alkyl group is a $C_2$-$C_6$ alkyl or $C_2$-$C_6$ alkyl group.

Cycloalkyl groups include mono-, bi-, or tri-cyclic alkyl groups having from 3 to 12 carbon atoms in the ring(s), or, in some embodiments, 3 to 10, 3 to 8, or 3, 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Bi- and tricyclic ring systems include both bridged cycloalkyl groups and fused rings, such as, but not limited to, adamantyl, decalinyl, and the like. Cycloalkyl groups may be unsubstituted or substituted as alkyl groups are. In some embodiments, a cycloalkyl group is a $C_3$-$C_{10}$ cycloalkyl or $C_3$-$C_6$ cycloalkyl group.

Haloalkyl groups include alkyl groups as defined above in which one or more of the hydrogen atoms are replaced by a halogen (i.e., F, Cl, Br, or I). In some embodiments, the haloalkyl group bears from 1, 2, 3, 4, 5, 6, or more halogens. In some embodiments, the haloalkyl group bears from 1 to 6 halogens or 1 to 3 halogens. In others, the haloalkyl is perhalogenated such as perfluorinated or perchlorinated. Examples of haloalkyl groups include but are not limited to $-CH_2Cl$, $-CH_2F$, $-CF_3$, $-CH_2CH_2Br$, and $-CH_2CF_3$. In some embodiments, a haloalkyl group is a $C_1$-$C_6$ haloalkyl or $C_1$-$C_4$ haloalkyl group.

Alkoxy groups are alkyl groups joined to the described structure through an oxygen atom, e.g. —Oalkyl. Examples of alkoxy groups include but are not limited to $-OCH_3$ (methoxy), $-OCH_2CH_3$ (ethoxy), and the like.

Aryl groups are cyclic aromatic hydrocarbons containing 6-14 carbon atoms and do not contain heteroatoms. Aryl groups herein include monocyclic, bicyclic, and tricyclic ring systems, including fused rings. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain from 6-12 or even 6-10 carbon atoms in the ring portions of the groups. In some embodiments, the aryl groups are phenyl or naphthyl. Aryl groups may also include fused aromatic-aliphatic ring systems, e.g., indanyl, tetrahydronaphthyl, and the like. Aryl groups may be unsubstituted or optionally substituted with one or more alkyl, halo groups or one or more halogens. In some embodiments, the aryl groups are substituted with 1, 2 or 3 alkyl groups and/or 1-5 halogens.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl, or both the alkyl and aryl portions of the group. Representative aralkyl groups include but are not limited to benzyl and phenethyl groups and fused (cycloalkylaryl)alkyl groups such as 4-indanylethyl. Aralkyl groups may be unsubstituted or substituted. Representative substituted aralkyl groups may be substituted one or more times with alkyl groups or halogens as for aryl and alkyl groups.

Polyether groups are alkyl or alkoxy groups where the alkyl chain is interrupted by oxygen atoms. Generally, the structure may be represented as -alkyl-(O-alkyl)$_n$, or —Oalkyl(-O-alkyl)$_n$, where n is merely indicating a repeating group of oligomeric or polymeric length. Polyethylene glycol (PEG) groups are an example.

A halogen refers to any of fluorine, chlorine, bromine, or iodine atoms. A halide is a halogen anion such as $F^-$, $Cl^-$, $Br^-$, or $I^-$.

This disclosure is directed to non-flammable electrolytes for use in lithium- or sodium-ion batteries. As used herein, non-flammable is intended to mean that the electrolytes resist burning to any extent; they are not flammable.

In a first aspect, an electrolyte is provided. The electrolyte may be for use in a lithium-ion or sodium-ion battery. The electrolyte includes a salt and a solvent. According to various embodiments, the salt may be a lithium salt, a sodium salt, or a mixture of any two or more thereof. The solvent may include a compound that may be represented as Formula I, II, or a mixture of any two or more thereof:

(I)

(I)

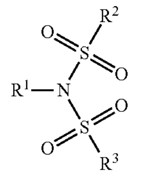

(II)

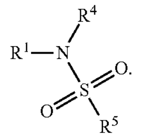

In Formula (I), $R^1$ is substituted or unsubstituted alkyl, substituted or unsubstituted haloalkyl, substituted or unsubstituted alkoxy, substituted or unsubstituted cycloalkyl, substituted or unsubstituted aryl, substituted or unsubstituted aralkyl, or substituted or unsubstituted polyether; $R^2$ is F, a fluoroalkyl, fluorocycloalkyl; and $R^3$ is F, a fluoroalkyl, fluorocycloalkyl. In Formula (II), $R^4$ is substituted or unsubstituted alkyl, substituted or unsubstituted haloalkyl, substituted or unsubstituted alkoxy, substituted or unsubstituted cycloalkyl, substituted or unsubstituted aryl, or substituted or unsubstituted polyether; and $R^5$ is a fluoroalkyl or fluorocycloalkyl. These compounds are liquids at room temperature, and provide desirable properties as conductors, and they are, importantly, non-flammable.

Where the compound is of Formula (I), and in various embodiments, le may be a $C_1$-$C_{12}$ alkyl that may or may not be fluorinated; $R^2$ may be F or a $C_1$-$C_{12}$ fluoroalkyl; and $R^3$ may be F or a $C_1$-$C_{12}$ fluoroalkyl. In other embodiments where the compound is of Formula (I), le may be a methyl, ethyl, n-propyl, iso-propyl, n-butyl, sec-butyl, or t-butyl; $R^2$ may be F, $CH_2F$, $CHF_2$, $CF_3$, $CH_2CF_3$, $CF_2CF_3$, or $CH(CF_3)_2$; and $R^3$ may be F, $CH_2F$, $CHF_2$, $CF_3$, $CH_2CF_3$, $CF_2CF_3$, or $CH(CF_3)_2$. In yet other embodiments, where the compound is of Formula (I), le may be methyl or ethyl; $R^2$ may be F, $CH_2F$, $CHF_2$, or $CF_3$; and $R^3$ may be F, $CH_2F$, $CHF_2$, or $CF_3$. In some embodiments, the compound of Formula (I) is one or more of $N(CH_3)(SO_2F)_2$, $N(CH_3)(SO_2CF_3)_2$, $N(CH_3)(SO_2CH_2CF_3)_2$, $N(CH_3)(SO_2CF_2CF_3)_2$, $N(C_2H_5)(SO_2F)_2$, $N(C_2H_5)(SO_2CF_3)_2$, $N(C_2H_5)(SO_2CH_2CF_3)_2$, $N(C_2H_5)(SO_2CF_2CF_3)_2$, $N(CH_2CF_3)(SO_2F)_2$, $N(CH_2CF_3)(SO_2CF_3)_2$, $N(CH_2CF_3)(SO_2CH_2CF_3)_2$, or $N(CH_2CF_3)(SO_2CF_2CF_3)_2$.

Where the compound is of Formula (II), and in various embodiments, $R^1$ may be a $C_1$-$C_{12}$ alkyl; $R^4$ may be a $C_1$-$C_{12}$ alkyl; and $R^5$ may be a $C_1$-$C_{12}$ fluoroalkyl. In other embodiments where the compound is of Formula (II), $R^1$ may be a methyl, ethyl, n-propyl, iso-propyl, n-butyl, sec-butyl, or t-butyl; $R^4$ may be a methyl, ethyl, n-propyl, iso-propyl, n-butyl, sec-butyl, or t-butyl; and $R^5$ may be $CH_2F$, $CHF_2$, $CF_3$, $CH_2CF_3$, $CF_2CF_3$, or $CH(CF_3)_2$. In yet other embodiments, where the compound is of Formula (II), le may be a methyl or ethyl; $R^4$ may be a methyl or ethyl; and $R^5$ may be $CH_2F$, $CHF_2$, or $CF_3$. In some embodiments, the compound of Formula (II) is one or more of $N(CH_3)_2(SO_2F)$, $N(CH_3)_2(SO_2CF_3)$, $N(CH_3)_2(SO_2CH_2CF_3)$, $N(CH_3)_2(SO_2CF_2CF_3)$, $N(CH_3)(CF_3)(SO_2F)$, $N(CH_3)(CF_3)(SO_2CF_3)$, $N(CH_3)(CF_3)(SO_2CH_2CF_3)$, $N(CH_3)(CF_3)(SO_2CF_2CF_3)$, $N(C_2H_5)_2(SO_2F)$, $N(C_2H_5)_2(SO_2CF_3)$, $N(C_2H_5)_2(SO_2CH_2CF_3)$, $N(C_2H_5)_2(SO_2CF_2CF_3)$, $N(CH_2CF_3)_2(SO_2F)$, $N(CH_2CF_3)_2(SO_2CF_3)$, $N(CH_2CF_3)_2(SO_2CH_2CF_3)$, or $N(CH_2CF_3)_2(SO_2CF_2CF_3)$.

Illustrative lithium salts that may be used in the electrolyte include, but are not limited to, $LiClO_4$, $LiPF_6$, $LiAsF_6$, $LiBF_4$, $LiB(C_2O_4)_2$ (LiBOB), $LiBF_2(C_2O_4)$ (LiDFOB), $LiCF_3SO_3$, $LiN(SO_2F)_2$ (LiFSI), $LiPF_3(C_2F_5)_3$ (LiFAP), $LiPF_4(CF_3)_2$, $LiPF_3(CF_3)_3$, $LiN(SO_2CF_3)_2$, $LiCF_3CO_2$, $LiC_2F_5CO_2$, $LiPF_2(C_2O_4)_2$ (LiDFOP), $LiP(C_2O_4)_3$ (LiTOP), $LiPF_4C_2O_4$ (LiTFOP), $LiPF_4(C_4H_2O_4)$ (LiTFMP), $LiBF_2(C_4H_2O_4)_2$ (LiDFMP), $LiC(CF_3SO_2)_3$, $LiN(SO_2C_2F_5)_2$, a lithium alkyl fluorophosphate, $Li_2B_{12}X_{12-\alpha}H_\alpha$, $Li_2B_{10}X_{10-\beta}H_\beta$, or a mixture of any two or more thereof, wherein X is OH, F, Cl, or Br; α is 0, 1, 2, 3, 4, 5, 6, 7, 8, 9, 10, 11, or 12; and β is 0, 1, 2, 3, 4, 5, 6, 7, 8, 9, or 10.

Illustrative sodium salts that may be used in the electrolyte include, but are not limited to, $NaClO_4$, $NaPF_6$, $NaAsF_6$, $NaBF_4$, $NaB(C_2O_4)_2$ (NaBOB), $NaBF_2(C_2O_4)$ (NaDFOB), $NaCF_3SO_3$, $NaN(SO_2F)_2$ (NaFSI), $NaPF_3(C_2F_5)_3$ (NaFAP), $NaPF_4(CF_3)_2$, $NaPF_3(CF_3)_3$, $NaCF_3CO_2$, $NaC_2F_5CO_2$, $NaPF_2(C_2O_4)_2$ (NaDFOP), $NaP(C_2O_4)_3$ (NaTOP), $NaPF_4C_2O_4$ (NaTFOP), $NaPF_4(C_4H_2O_4)$ (NaTFMP), $NaBF_2(C_4H_2O_4)_2$ (NaDFMP), $NaN(CF_3SO_2)_2$, $NaC(CF_3SO_2)_3$, $NaN(SO_2C_2F_5)_2$, a sodium alkyl fluorophosphate, $Na_2B_{12}X_{12-\alpha}H_\alpha$, $Na_2B_{10}X_{10-\beta}H_\beta$, or a mixture of any two or more thereof, wherein X is OH, F, Cl, or Br; α is 0, 1, 2, 3, 4, 5, 6, 7, 8, 9, 10, 11, or 12; and β is 0, 1, 2, 3, 4, 5, 6, 7, 8, 9, or 10.

In some embodiments, the salt is $LiPF_6$, $LiBF_4$, $LiB(C_2O_4)_2$ (LiBOB), $LiBF_2(C_2O_4)$ (LiDFOB), $LiN(SO_2F)_2$ (LiFSI), $LiN(SO_2CF_3)_2$ (LiTFSI), $NaPF_6$, $NaB(C_2O_4)_2$ (NaBOB), $NaBF_2(C_2O_4)$ (NaDFOB), $NaN(SO_2F)_2$ (NaFSI), $NaN(SO_2CF_3)_2$, or a mixture of any two or more thereof. The salt may be present in the electrolyte at a concentration of about 0.01 M to about 5 M. In some embodiments, the salt is present in the electrolyte at a concentration of about 0.01 M to about 1.5 M.

Other solvents may be incorporated into the electrolyte, at a concentration that does not negatively affect the non-flammable character. In such cases, it is noted that these other solvents are "diluents." Illustrative diluents include, but are not limited to, a carbonate, a lactone, a nitrile, an ether, a fluorinated carbonate, a fluorinated lactone, a fluorinated ether, a fluorinated sulfone, a fluorinated ester, a fluorinated glymes, or a mixture of any two or more thereof. More specifically, diluents may include 1,1,2,2-tetrafluoroethyl-2,2,3,3-tetrafluoropropyl ether (TTE), 1,2-(1,1,2,2-tetrafluoroethoxy)ethane (TFEE), 1,1,1-trifluoroethyl-2,2,3,3-tetrafluoropropyl ether (TFTFE), bis-(trifluoroethyl) ether (BTFE), 1,1,2,2-tetrafluoroethyl-2,2,3,3,3-pentafluoropropyl ether, 2,2,2-trisfluoroethyl-1,1,2,3,3,3-hexafluoropropyl ether, ethyl-1,1,2,3,3,3-hexafluoropropyl ether, difluoromethyl-2,2,3,3,3-pentafluoropropyl ether, difluoromethyl-2,2,3,3-tetrafluoropropyl ether; 2-fluoro-1,3-dioxolane, 2,2-difluoro-1,3-dioxolane, 2-trifluoromethyl-1,3-dioxolane; 2,2-bis(trifluoromethyl)-1,3-dioxolane, 4-fluoro-1,3-dioxolane; 4,5-difluoro-1,3-dioxolane, 1,3-dioxolane (DOL), dimethoxyethane (DME), tetrahydrofuran, di(ethylene glycol) dimethyl ether, tri(ethylene glycol) dimethyl ether, diglyme (DGM), partly silanized ether, tetra(ethylene glycol) dimethyl ether (TEGDME), poly (ethylene glycol) dimethyl ether (PEGDME), 1,4-dioxane, ethylene carbonate, dimethyl carbonate, ethyl methyl carbonate, diethyl carbonate, propylene carbonate, fluorinated carbonate, fluorinated carbonated-based diluent comprises fluoroethylene carbonate (FEC), bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, or a mixture of any two or more thereof. The diluent may be present in the electrolyte in a solvent to diluent ratio of from about 50:50 to about 90:10, from about 50:50 to about 80:10, or from about 50:50 to about 75:25.

The electrolyte my further include a stabilizing additive for the electrolyte and/or the electrodes and the overall electrochemical device incorporating such electrolytes. Illustrative stabilizing additives include a N—O compound, polysulfide, phosphorus pentasulfide, fumaronitrile, ethyl 3,3,3-trifluoropropanoate (TFPE), vinylene carbonate (VC), fluoroethylene carbonate (FEC), ethylene sulfite (ES), p-toluenesulfonyl isocyanate (PSTI), triethylborate (TEB), tris(trimethylsilyl)borate (TMSB), tris(trimethylsilyl)phosphite (TMSPi), tris(2,2,2-trifluoroethyl)phosphite (TTFPi), tris(trimethylsilyl)borate (TMSB), phenyl vinyl sulfone (PVS), ethylene glycol bis(propionitrile)ether (EGBE), terthiophene (3THP), quercetin (Qc), or a mixture of any two or more thereof.

As noted, the electrolytes are for use in electrochemical devices such as lithium-ion batteries, sodium-ion batteries, lithium-air batteries, sodium-air batteries, capacitors, etc. Accordingly, an electrochemical device is provided that includes a cathode, an anode, and any of the electrolytes as described herein. In some embodiments, the electrochemical device is a lithium or sodium secondary battery. For example, the secondary battery is a lithium battery, a lithium-ion battery, a lithium-sulfur battery, a lithium-air battery, sodium battery, a sodium-ion battery, a sodium-sulfur battery, or a sodium-air battery. In some embodiments, a porous separator may be disposed between the anode and the cathode.

Illustrative cathodes include layered lithium nickel cobalt manganese oxide, lithium nickel cobalt aluminium oxide, spinel lithium nickel manganese oxide, lithium iron phosphate, lithium cobalt oxide, lithium nickel oxide, lithium manganese oxide, or a mixture of any two of more thereof. Suitable cathodes include those such as, but not limited to, a lithium metal oxide, spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $Li_{1-x'}Ni_\alpha Mn_\beta Co_\gamma Met'_\delta O_{2-z'}F_{z'}$, $A_{n'}B_2(XO_4)_3$ (NASICON), vanadium oxide; lithium peroxide, sulfur, polysulfide, a lithium carbon monofluoride (also known as LiCFx), or mixtures of any two or more thereof, where Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; $0 \le x \le 0.3$, $0 \le y \le 0.5$, $0 \le z \le 0.5$; $0 \le x' \le 0.4$, $0 \le \alpha \le 1$, $0 \le \beta \le 1$, $0 \le y \le 1$, $0 \le \delta \le 0.4$, and $0 \le z' \le 0.4$; and $0 \le n' \le 3$. According to some embodiments, the spinel is a spinel manganese oxide with the formula of $Li_{1+x}Mn_{2-z}Met'''_yO_{4-m}X'n$, wherein Met''' is Al, Mg, Ti, B, Ga, Si, Ni, or Co; X' is S or F; and wherein $0 \le x \le 0.3$, $0 \le y \le 0.5$, $0 \le z \le 0.5$, $0 \le m \le 0.5$ and $0 \le n \le 0.5$. In other embodiments, the olivine has a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \le x \le 0.3$, $0 \le y \le 0.5$, $0 \le z \le 0.5$, $0 \le m \le 0.5$ and $0 \le n \le 0.5$.

For lithium secondary batteries, or cathodes to be used in lithium secondary batteries, the cathodic material may include either lithiated materials or surface coated lithiated materials. For example, such materials and composites include, but are not limited to, $MnO_2$, $V_2O_5$, $LiVO_3$, air (oxygen), $FeF_2$, a spinel, an olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $Li_{1+x}Mn_{2-z}M^4_yO_{4-m}X^1_n$, $LiFe_{1-z}M^6_yPO_{4-m}X^1_n$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x''}Ni_\alpha Mn_\beta Co_\gamma M^5_\delta O_{2-z''}$ both single composition or gradient composition, $Li_2MnO_3$-$Li_aM_bM'_cM''_dO_e$, $Li_{n'}B^1_2(M^2O_4)_3$ (Nasicon), $Li_2MSiO_4$, or a mixture of any two or more thereof, wherein $M^2$ is P, S, Si, W, or Mo; $M^4$ is Al, Mg, Ti, B, Ga, Si, Ni, or Co; $M^5$ is Mg, Zn, Al, Ga, B, Zr, or Ti; A is Li, Ag, Cu, Na, Mn, Fe, Co, Ni, or Zn; $M^6$ is Al, Mg, Ti, B, Ga, Si, Ni, Mn or Co; M, M', and M'' are transition metals; $B^1$ is Ti, V, Cr, Fe, or Zr; $X^1$ is S or F; $0 \le x \le 0.3$; $0 \le y \le 0.5$; $0 \le z \le 0.5$; $0 \le m \le 0.5$; $0 \le n \le 0.5$; $0 \le x'' \le 0.4$; $0 \le a \le 2$; $0 \le b \le 1$; $0 \le c \le 1$; $0 \le d \le 1$; $0 \le \alpha \le 1$; $0 \le \beta \le 1$; $0 \le y \le 1$; $0 \le \delta \le 0.4$; $0 \le z'' \le 0.4$; $0 \le n' \le 3$; $0 < a+b+c+d < 6$; $0 \le e \le 4$; and $0 \le \alpha+\beta+\gamma+\delta$.

For sodium secondary batteries, or cathodes to be used in sodiated secondary batteries, the cathodic material may include either sodiated materials or surface coated sodiated materials. For example, such materials and composites include, but are not limited to a spinel, an olivine, a carbon-coated olivine, $NaFePO_4$, $NaCoO_2$, $NaNiO_2$, $NaNi_{1-x}Co_yM^4_zO_2$, $NaMn_{0.5}Ni_{0.5}O_2$, $NaMn_{1/3}Co_{1/3}Ni_{1/3}O_2$, $NaMn_2O_4$, $NaFeO_2$, $NaM^4_{0.5}Mn_{1.5}O_4$, $Na_{1+x''}Ni_\alpha Mn_\beta Co_\gamma M^5_\delta O_{2-z''}F_{z''}$, $Na_2MnO_3$–$Na_aM_bM'_cM''_dO_e$, $Na_{n'}B^1_2(M^2O_4)_3$, $Na_2MSiO_4$, $NaVPO_4F$ or a mixture of any two or more thereof, wherein $M^2$ is P, S, Si, W, or Mo; $M^4$ is Al, Mg, Ti, B, Ga, Si, Mn, or Co; $M^5$ is Mg, Zn, Al, Ga, B, Zr, or Ti; M, M', and M'' are transition metals; $B^1$ is Ti, V, Cr, Fe, or Zr; $0 \le x \le 0.3$; $0 \le y \le 0.5$; $0 \le z \le 0.5$; $0 \le m \le 0.5$; $0 \le n \le 0.5$; $0 \le x'' \le 0.4$; $0 \le a \le 2$; $0 \le b \le 1$; $0 \le c \le 1$; $0 \le d \le 1$; $0 \le \delta \le 1$; $0 \le \beta \le 1$; $0 \le \gamma \le 1$; $0 \le \delta \le 1$; $0 \le \delta' \le 0.4$; $0 \le z'' \le 0.4$; $0 \le n' \le 3$; $0 < a+b+c+d$, and $0 < e$.

The cathode may be further stabilized by surface coating the active particles with a material that can neutralize acid or otherwise lessen or prevent leaching of the transition metal ions. Hence the cathodes can also comprise a surface coating of a metal oxide or fluoride such as $ZrO_2$, $TiO_2$, $ZnO_2$, $WO_3$, $Al_2O_3$, MgO, $SiO_2$, $SnO_2$, $AlPO_4$, $Al(OH)_3$, $AlF_3$, $ZnF_2$, $MgF_2$, $TiF_4$, $ZrF_4$, $LiMPO_4$ or $LiMBO_3$, where in M indicates transition metal such as but not limited to Ni, Mn, Co, or a mixture of any two or more thereof, or of any other suitable metal oxide or fluoride. The coating can be applied to a carbon-coated cathode. The cathode may be further stabilized by surface coating the active particles with polymer materials. Examples of polymer coating materials include, but not limited to, polysiloxanes, polyethylene glycol, or poly(3,4-ethylenedioxythio-phene) polystyrene sulfonate, a mixture of any two or more polymers. The cathode may be carbon-coated to improve the stability and conductivity via chemical or physical method. Examples of carbon coating includes but not limit to high-energy mixing, vapor phase deposition, plasma-assisted chemical vapor deposition (CVD), spraying, liquid-phase deposition, electrochemical deposition, plasma enhanced atomic layer deposition, calcination of carbon precursor, or other mechanical or chemical means.

The cathode, or the cathode(s) of the secondary battery, may also include a primary cathodic material, as well as a secondary cathodic material. The primary cathodic material may include a lithiated positive active material, a non-lithiated positive active material, a sodiated positive active material, a non-sodiated positive active material, or a mixture of any two or more thereof. In some embodiments, the primary cathodic material may include a lithiated positive active material, a sodiated positive active material, or a mixture of lithiated and sodiated positive active material.

The primary cathodic material may include a positive active material that is configured to only insert, or de-insert lithium or sodium. For example, the positive active material may be configured to only insert, or de-insert lithium from about 1.5 V to about 5.0 V vs. lithium. Alternatively, the positive active material may be configured to only insert, or de-insert sodium from 1.2 to 5.0 V vs. sodium. As used herein, "insert" or "de-insert" is used to refer to the movement of either the lithium or sodium ion(s) into, or out of, respectively, the cathode material through either absorption, adsorption, intercalation, conversion, or alloying.

The cathode may include a current collector, a porous carbon (e.g. conductive) material, and/or a polymeric binder. The current collector may include copper, stainless steel, titanium, tantalum, platinum, gold, aluminum, nickel, cobalt-nickel alloys, highly alloyed ferritic stainless steel containing molybdenum and chromium; or nickel-, chromium-, or molybdenum-containing alloys. The current collector may be a foil, mesh, or screen, and the porous carbon material and optional metal oxide are contacted with the current collector by casting, pressing, or rolling the mixture thereto. The porous carbon material may include microporous carbon, mesoporous carbon, mesoporous microbeads, graphite, expandable graphite, carbon black, or carbon nanotubes. Commercial examples of carbon black include, but are not limited to, Super P, Black Pearl 2000, Denka Black, Vulcan XC72R, Ketjen black. The polymeric binder may include poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, or a copolymer of any two or more such polymers.

Illustrative anodes include lithium metal, graphitic materials, amorphous carbon, $Li_4Ti_5O_{12}$, tin alloys, silicon, a silicon alloy, an intermetallic compound, or a mixture of any two or more thereof. For example, suitable anodes include those such as lithium metal graphite, Li metal, Sb, Si, Si—C, SiO, Sn, tin oxide, $Li_4Ti_5O_{12}$, a composite tin alloy, a transition metal oxide, graphitic materials such as hard carbon or soft carbon, lithium metal nitride, phosphorous including black and red phosphorous, and phosphorous carbon composites; as well as doped phosphorus carbon with Sb, Si, Si—C, SiO, Sn, tin oxide, $Li_4Ti_5O_{12}$, a composite tin alloy, a transition metal oxide, or a lithium metal nitride or a mixture of any two or more. Other illustrative graphitic materials including natural graphite, artificial graphite, graphitized meso-carbon microbeads (MCMB), and graphite fibers, as well as any amorphous carbon materials.

In some embodiments, the anode comprises lithium metal, graphitic materials, amorphous carbon, $Li_4Ti_5O_{12}$, tin alloys, silicon or silicon alloys, intermetallic compounds, or mixtures of any two or more such materials. In some embodiments, the anode comprises silicon or silicon alloys.

In addition to the Li-ion storage active material, the anode may also include a current collector, a conductive carbon material, a binder, or any combination thereof. The anode current collector may be prepared from a wide variety of materials. For example, illustrative current collectors include, but are not limited to, carbon, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy.

The current collectors may be in electrical contact with one another through an external circuit. The secondary battery may exhibit a jellyroll or stacked construction. A lithium source material (i.e., $Li_2O_2$) is incorporated on the positive electrode side or into the electrolyte.

In some embodiments, the anode and cathode are separated from each other by a porous separator. The separator for the lithium battery often is a microporous polymer film. Examples of polymers for forming films include: nylon, cellulose, nitrocellulose, polysulfone, polyacrylonitrile, polyvinylidene fluoride, polypropylene, polyethylene, polybutene, or co-polymers or blends of any two or more such polymers. In some instances, the separator is an electron beam treated micro-porous polyolefin separator. The electron treatment can improve the deformation temperature of the separator and can accordingly enhance the high temperature performance of the separator. Additionally, or alternatively, the separator can be a shut-down separator. The shut-down separator can have a trigger temperature above 130° C. to permit the electrochemical cells to operate at temperatures up to 130° C.

The electrochemical cells described herein may be used for various types of applications. For example, the secondary batteries may be used in portable electronics such as cell phones, laptop computers, and cameras, and in large power applications such in electric vehicles, hybrid electric vehicles, plug-in hybrid electric vehicles, and smart grids.

The present invention, thus generally described, will be understood more readily by reference to the following examples, which are provided by way of illustration and are not intended to be limiting of the present invention.

EXAMPLES

Example 1. Based upon a procedure adapted from EP 2415758, $N(CH_3(SO_2F)_2$ ("MeFSI") was prepared according to Scheme 1.

Scheme 1

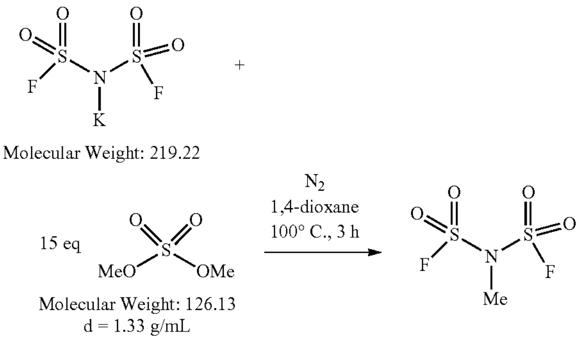

Under an inert atmosphere, a 2 liter, 3-neck flask (fitted with a condenser, a stir bar and a thermocouple) was charged with KFSI (60 g), anhydrous 1,4-dioxane (24 mL), and dimethyl sulfate (24 mL). The mixture was stirred at 100° C. for 3 hours. After heating, the reaction was cooled to 70° C., and ice-cold water (900 mL) was added slowly. The temperature was monitored and kept under 90° C. during the addition of water. After the addition of water, the reaction was heated one hour at 70° C. and then cooled to room temperature. The solution was transferred to a separation funnel, and the bottom layer (MeFSI) was removed. Additional MeFSI was recovered by extraction of the aqueous phase with $CHCl_3$ (200 mL×3). The washes were then back-extracted with D.I. water (600 mL) to remove 1,4-dioxane. The organic later was dried with anhydrous $Na_2SO_4$. After the solids were collected by filtration, the solvent was removed from the organic fraction with a Rotovap. MeFSI was then purified by vacuum distillation. To remove residual dioxane, the mixture was initially distilled at 50-65° C./50 torr, and then the temperature was increased to collect MeFSI at 70-75° C. (50 torr). $^1H$ NMR ($CDCl_3$, 80 MHz): 3.65 ppm+traces of dioxane. $^{19}F$ NMR ($CDCl_3$, 75 MHz): 56.67 ppm. GC/MS: 99.7%, retention time 5.596 min, m/z 194 (M−1).

Example 2. NMC622/graphite cells were prepared with an electrolyte of 1.0M LiFSI in a mixture of MeFSI in γ-butyrolactone (9:1) with 5 vol % vinylene carbonate and 1.0M LiFSI in a mixture of MeFSI in ethylene carbonate (9:1) with 5 vol % vinylene carbonate. Cell performance data is presented in FIG. 1. When formulated with γ-butyrolactone or ethylene carbobate as co-solvents and LiFSI as a salt, the MeFSI-based electrolytes showed good cycling performance (capacity retention and Coulombic efficiency) in a NMC622/graphite cell.

Figure 2:
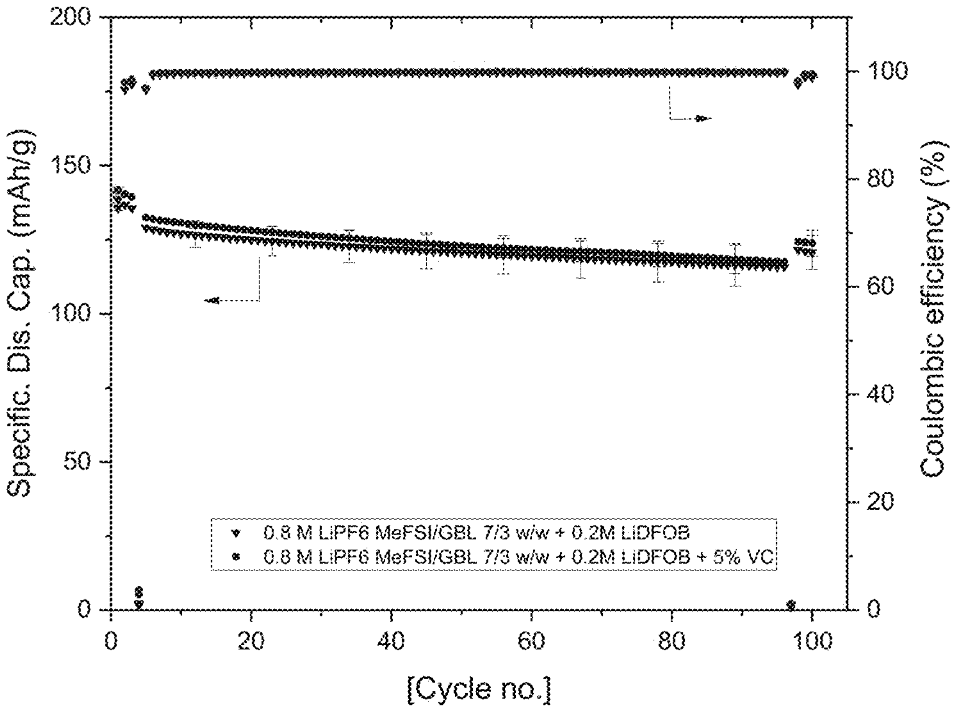
FIG. 2 is a dual axis graph illustrating the cell performance of MeFSI-based electrolytes in a NMC622/graphite cell in terms of specific capacity and Coulombic efficiency, according to the examples.

Example 3. NMC622/graphite cells were prepared with an electrolyte of 0.8 M $LiPF_6$ in a mixture of MeFSI in γ-butyrolactone (9:1) and 0.2 M LiDFOB and 0.8 M $LiPF_6$ in a mixture of MeFSI in γ-butyrolactone (9:1) with 5 vol % vinylene carbonate. Cell performance data is presented in FIG. 2. When formulated with γ-butyrolactone as cosolvent and $LiPF_6$ as salt, the MeFSI-based electrolytes showed good cycling performance (capacity retention and Coulombic efficiency) in a NMC622/graphite cell.

Figure 3:
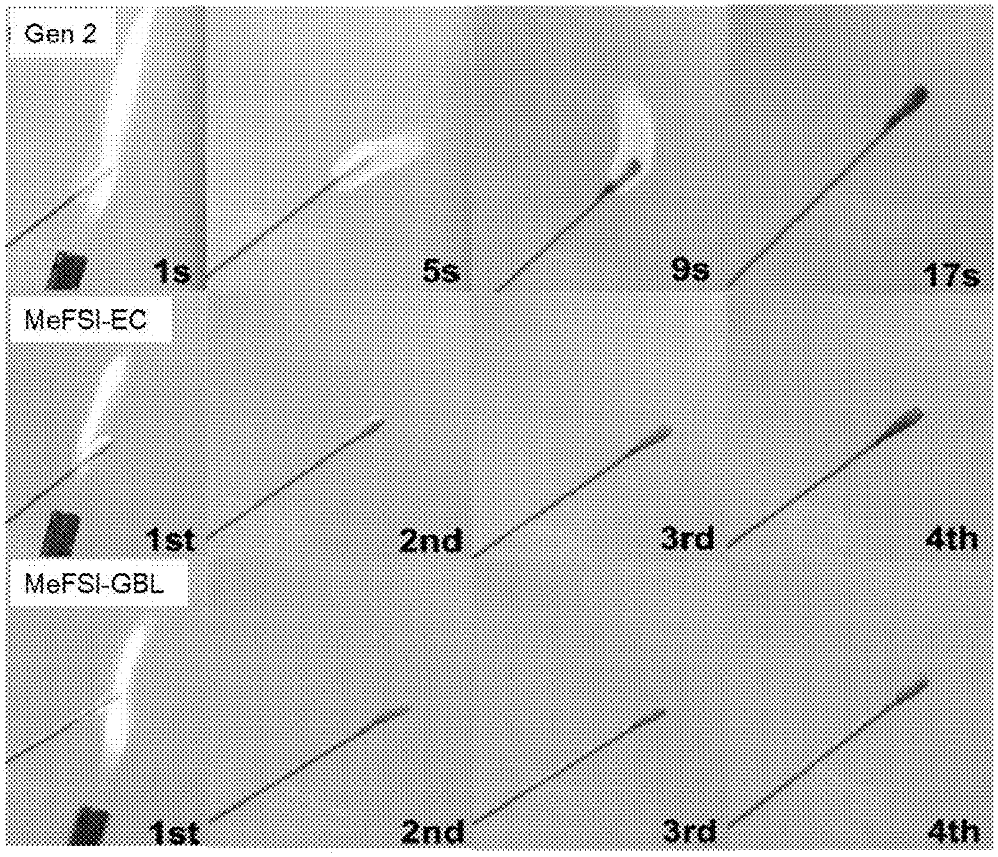
FIG. 3 is a series of photographs illustrating the nonflammability of MeFSI-based electrolytes, according to the examples.

Example 4. FIG. 3 is a series of photographs illustrating the nonflammability of MeFSI-based electrolytes, according to the examples. In the photographs, the electrolyte labelled as "Gen 2" is an electrolyte containing 1.2M $LiPF_6$ in 3:7 ethylene carbonate and ethylmethylcarbonate. The other two, LiFSI-EC and LiFSI-GBL are the electrolytes of 1.0 M lithium trifluoromethansulfonimide and ethylene carbonate and 1.0 M lithium trifluoromethansulfonimide and γ-butylrolactone. As illustrated in FIG. 3, a conventional Gen 2 electrolyte catches fire immediately when it is ignited by a torch, and burns out within seconds. In comparison, MeFSI-based electrolytes are nonflammable and will not catch fire when tested under the same conditions.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure. Other embodiments are set forth in the following claims.

What is claimed is:

1. An electrolyte for use in a lithium-ion or sodium-ion battery, the electrolyte comprising:

a salt comprising a lithium salt, a sodium salt, or a mixture of any two or more thereof:

a solvent comprising a compound represented as Formula I, II, or a mixture of any two or more thereof:

(I)

(I)

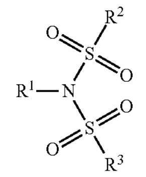

(II)

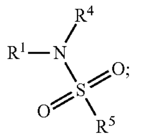

wherein:

$R^1$ is substituted or unsubstituted alkyl, substituted or unsubstituted haloalkyl, substituted or unsubstituted alkoxy, substituted or unsubstituted cycloalkyl, substituted or unsubstituted aryl, or substituted or unsubstituted polyether;

$R^2$ is F, a fluoroalkyl, fluorocycloalkyl;

$R^3$ is F, a fluoroalkyl, fluorocycloalkyl; and $R^{1'}$ is methyl, ethyl, n-propyl, iso-propyl, n-butyl, sec-butyl, or t-butyl;

$R^4$ is a methyl, ethyl, n-propyl, iso-propyl, n-butyl, sec-butyl, or t-butyl; and $R^5$ is a fluoroalkyl or fluorocycloalkyl.

2. The electrolyte of claim 1, wherein the compound is of Formula (I) and $R^1$ is a $C_1$-$C_{12}$ alkyl or a $C_1$-$C_{12}$ fluoroalkyl; $R^2$ is F or a $C_1$-$C_{12}$ fluoroalkyl, and $R^3$ is F or a $C_1$-$C_{12}$ fluoroalkyl.

3. The electrolyte of claim 1, wherein the compound is of Formula (I) and $R^1$ is methyl, ethyl, n-propyl, iso-propyl, n-butyl, sec-butyl, or t-butyl; $R^2$ is F, $CH_2F$, $CHF_2$, $CF_3$, $CH_2CF_3$, $CF_2CF_3$, or $CH(CF_3)_2$; and $R^3$ is F, $CH_2F$, $CHF_2$, $CF_3$, $CH_2CF_3$, $CF_2CF_3$, or $CH(CF_3)_2$.

4. The electrolyte of claim 1, wherein $R^5$ is $CH_2F$, $CHF_2$, $CF_3$, $CH_2CF_3$, $CF_2CF_3$, or $CH(CF_3)_2$.

5. The electrolyte of claim 1, wherein the compound is of Formula (I) and $R^1$ is methyl, or ethyl; $R^2$ is F, $CH_2F$, $CHF_2$, or $CF_3$; and $R^3$ is F, $CH_2F$, $CHF_2$, or $CF_3$.

6. The electrolyte of claim 1, wherein the compound is of Formula (II) and $R^{1'}$ is methyl, or ethyl; $R^4$ is a methyl, or ethyl; and $R^5$ is $CH_2F$, $CHF_2$, or $CF_3$.

7. The electrolyte of claim 1, wherein the compound is one or more of $N(CH_3)(SO_2F)_2$, $N(CH_3)(SO_2CF_3)_2$, $N(CH_3)(SO_2CH_2CF_3)_2$, $N(CH_3)(SO_2CF_2CF_3)_2$, $N(C_2H_5)(SO_2F)_2$, $N(C_2H_5)(SO_2CF_3)_2$, $N(C_2H_5)(SO_2CH_2CF_3)_2$, $N(C_2H_5)(SO_2CF_2CF_3)_2$, $N(CH_2CF_3)(SO_2F)_2$, $N(CH_2CF_3)(SO_2CF_3)_2$, $N(CH_2CF_3)(SO_2CH_2CF_3)_2$, $N(CH_2CF_3)(SO_2CF_2CF_3)_2$, $N(CH_3)_2(SO_2F)$, $N(CH_3)_2(SO_2CF_3)$, $N(CH_3)_2(SO_2CH_2CF_3)$, $N(CH_3)_2(SO_2CF_2CF_3)$, $N(C_2H_5)_2(SO_2F)$, $N(C_2H_5)_2(SO_2CF_3)$, $N(C_2H_5)_2(SO_2CH_2CF_3)$, $N(C_2H_5)_2(SO_2CF_2CF_3)$, $N(CH_2CF_3)_2(SO_2F)$, $N(CH_2CF_3)_2(SO_2CF_3)$, $N(CH_2CF_3)_2(SO_2CH_2CF_3)$, or $N(CH_2CF_3)_2(SO_2CF_2CF_3)$.

8. The electrolyte of claim 1, wherein the salt comprises $LiClO_4$, $LiPF_6$, $LiAsF_6$, $LiBF_4$, $LiB(C_2O_4)_2$ (LiBOB), $LiBF_2(C_2O_4)$ (LiDFOB), $LiCF_3SO_3$, $LiN(SO_2F)_2$ (LiFSI), $LiPF_3(C_2F_5)_3$ (LiFAP), $LiPF_4(CF_3)_2$, $LiPF_3(CF_3)_3$, $LiN(SO_2CF_3)_2$, $LiCF_3CO_2$, $LiC_2F_5CO_2$, $LiPF_2(C_2O_4)_2$ (LiDFOP), $LiP(C_2O_4)_3$ (LiTOP), $LiPF_4C_2O_4$ (LiTFOP), $LiPF_4(C_4H_2O_4)$ (LiTFMP), $LiBF_2(C_4H_2O_4)_2$ (LiDFMP), $LiC(CF_3SO_2)_3$, $LiN(SO_2C_2F_5)_2$, a lithium alkyl fluorophosphate, $Li_2B_{12}X_{12-\alpha}H_\alpha$, $Li_2B_{10}X_{10-\beta}H_\beta$, or a mixture of any two or more thereof, wherein X is OH, F, Cl, or Br; $\alpha$ is 0, 1, 2, 3, 4, 5, 6, 7, 8, 9, 10, 11, or 12; and $\beta$ is 0, 1, 2, 3, 4, 5, 6, 7, 8, 9, or 10.

9. The electrolyte of claim 1, wherein the salt comprises $NaClO_4$, $NaPF_6$, $NaAsF_6$, $NaBF_4$, $NaB(C_2O_4)_2$ (NaBOB), $NaBF_2(C_2O_4)$ (NaDFOB), $NaCF_3SO_3$, $NaN(SO_2F)_2$ (NaFSI), $NaPF_3(C_2F_5)_3$ (NaFAP), $NaPF_4(CF_3)_2$, $NaPF_3(CF_3)_3$, $NaCF_3CO_2$, $NaC_2F_5CO_2$, $NaPF_2(C_2O_4)_2$ (NaDFOP), $NaP(C_2O_4)_3$ (NaTOP), $NaPF_4C_2O_4$ (NaTFOP), $NaPF_4(C_4H_2O_4)$ (NaTFMP), $NaBF_2(C_4H_2O_4)_2$ (NaDFMP), $NaN(CF_3SO_2)_2$, $NaC(CF_3SO_2)_3$, $NaN(SO_2C_2F_5)_2$, a sodium alkyl fluorophosphate, $Na_2B_{12}X_{12-\alpha}H_\alpha$, $Na_2B_{10}X_{10-\beta}H_\beta$, or a mixture of any two or more thereof, wherein X is OH, F, Cl, or Br; a is 0, 1, 2, 3, 4, 5, 6, 7, 8, 9, 10, 11, or 12; and R is 0, 1, 2, 3, 4, 5, 6, 7, 8, 9, or 10.

10. The electrolyte of claim 1, wherein the salt comprises $LiPF_6$, $LiB(C_2O_4)_2$ (LiBOB), $LiBF_2(C_2O_4)$ (LiDFOB), $LiN(SO_2F)_2$ (LiFSI), $LiN(SO_2CF_3)_2$, $NaPF_6$, $NaB(C_2O_4)_2$ (NaBOB), $NaBF_2(C_2O_4)$ (NaDFOB), $NaN(SO_2F)_2$ (NaFSI), $NaN(SO_2CF_3)_2$, or a mixture of any two or more thereof.

11. The electrolyte of claim 1, wherein the salt is present in the electrolyte in a concentration of from about 0.01 M to about 5 M.

12. The electrolyte of claim 1, wherein the salt is present in the electrolyte in a concentration of from about 0.01 M to about 1.5 M.

13. The electrolyte of claim 1, wherein the solvent further comprises a diluent.

14. The electrolyte of claim 13, wherein the diluent comprises a carbonate, a lactone, a nitrile, an ether, a fluorinated carbonate, a fluorinated lactone, or a fluorinated ether.

15. The electrolyte of claim 14, wherein the diluent comprises 1,1,2,2-tetrafluoroethyl-2,2,3,3-tetrafluoropropyl ether (TTE), 1,2-(1,1,2,2-tetrafluoroethoxy)ethane (TFEE), 1,1,1-trifluoroethyl-2,2,3,3-tetrafluoropropyl ether (TFTFE), bis-(trifluoroethyl) ether (BTFE), 1,1,2,2-tetrafluoroethyl-2,2,3,3,3-pentafluoropropyl ether, 2,2,2-tris-fluoroethyl-1,1,2,3,3,3-hexafluoropropyl ether, ethyl-1,1,2,3,3,3-hexafluoropropyl ether, difluoromethyl-2,2,3,3,3-pentafluoropropyl ether, difluoromethyl-2,2,3,3-tetrafluoropropyl ether; 2-fluoro-1,3-dioxolane, 2,2-difluoro-1,3-dioxolane, 2-trifluoromethyl-1,3-dioxolane; 2,2-bis(trifluoromethyl)-1,3-dioxolane, 4-fluoro-1,3-dioxolane; 4,5-difluoro-1,3-dioxolane, 1,3-dioxolane (DOL), dimethoxyethane (DME), tetrahydrofuran, di(ethylene glycol) dimethyl ether, tri(ethylene glycol) dimethyl ether, diglyme (DGM), partly silanized ether, tetra(ethylene glycol) dimethyl ether (TEGDME), poly (ethylene glycol) dimethyl ether (PEGDME), 1,4-dioxane, ethylene carbonate, dimethyl carbonate, ethyl methyl carbonate, diethyl carbonate, propylene carbonate, fluorinated carbonate, fluorinated carbonated-based diluent comprises fluoroethylene carbonate (FEC), bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, or a mixture of any two or more thereof.

16. The electrolyte of claim 13, wherein the diluent is present in the electrolyte in a solvent to diluent ratio of from about 50:50 to about 90:10, from about 50:50 to about 80:10, or from about 50:50 to about 75:25.

17. The electrolyte of claim 1 further comprising a stabilizing additive.

18. The electrolyte of claim 17, wherein the stabilizing additive comprises a N—O compound, polysulfide, phosphorus pentasulfide, fumaronitrile, ethyl 3,3,3-trifluoropropanoate (TFPE), vinylene carbonate (VC), fluoroethylene carbonate (FEC), ethylene sulfite (ES), p-toluenesulfonyl isocyanate (PSTI), triethylborate (TEB), tris(trimethylsilyl) borate(TMSB), tris(trimethylsilyl)phosphite (TMSPi), tris (2,2,2-trifluoroethyl)phosphite (TTFPi), tris(trimethylsilyl) borate (TMSB), phenyl vinyl sulfone (PVS), ethylene glycol bis(propionitrile)ether (EGBE), terthiophene (3THP), quercetin (Qc), or a mixture of any two or more thereof.

19. An electrochemical device comprising:

a cathode;

an anode; and an electrolyte of claim 1.

20. The electrolyte of claim 1, wherein the compound comprises a compound of Formula (II).

* * * * *